United States Patent [19]

Hyman et al.

[11] 3,998,931
[45] Dec. 21, 1976

[54] PROCESS FOR CONTINUOUS CONVERSION OF LIQUID WHITE PHOSPHORUS TO RED PHOSPHORUS IN AGITATED SLURRY

[75] Inventors: Daniel Hyman, Greenwich, Conn.; John Donald Chase, Mississauga, Canada

[73] Assignee: American Cyanamid Company, Stamford, Conn.

[22] Filed: June 30, 1975

[21] Appl. No.: 591,908

[52] U.S. Cl. .............................................. 423/322
[51] Int. Cl.² .................. C01B 25/01; C01B 25/02
[58] Field of Search .................... 423/299, 322, 323

[56] References Cited
UNITED STATES PATENTS

| | | | |
|---|---|---|---|
| 2,397,951 | 4/1946 | De Witt | 423/322 |
| 2,476,335 | 7/1949 | Tusson | 423/322 |
| 3,207,583 | 9/1965 | Brautigom et al. | 423/322 |

*Primary Examiner*—Oscar R. Vertiz
*Assistant Examiner*—Gregory A. Heller
*Attorney, Agent, or Firm*—Gordon L. Hart

[57] ABSTRACT

An agitated reactor is described for use in the continuous conversion of liquid white phosphorus to red phosphorus. Critical relations of the reactor vessel shape and measurements and the agitator measurements are described for preventing build-up of red phosphorus solids in the reactor as the continuous conversion proceeds.

1 Claim, 1 Drawing Figure

U.S. Patent     Dec. 21, 1976     3,998,931
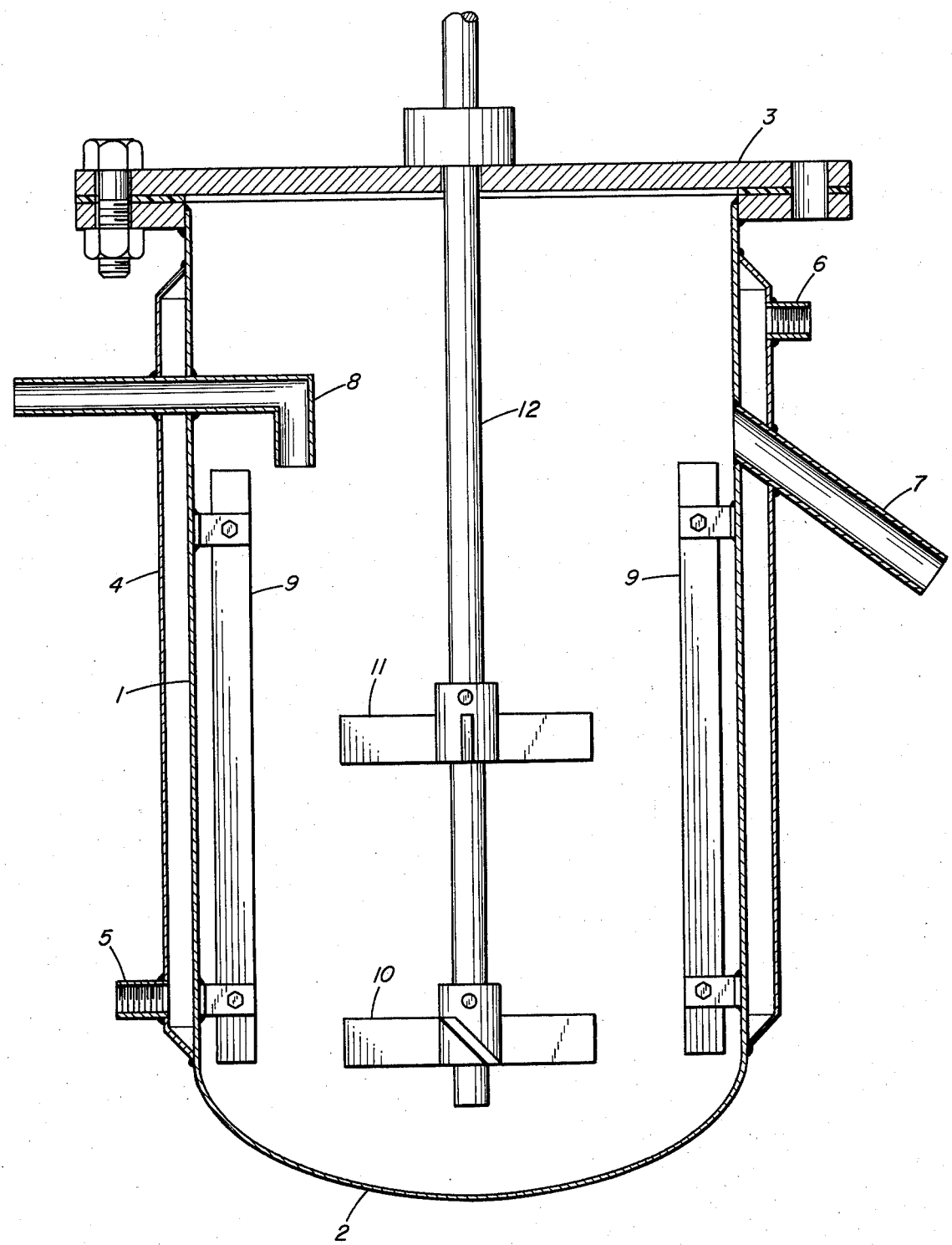

PROCESS FOR CONTINUOUS CONVERSION OF LIQUID WHITE PHOSPHORUS TO RED PHOSPHORUS IN AGITATED SLURRY

The invention relates to manufacture of red phosphorus by conversion of liquid white phosphorus.

Liquid white phosphorus will convert to red phosphorus slowly and exothermally. The half life of the reaction is 5.65 hrs. at 280° C. The rate of conversion becomes appreciable above about 220° C. and the rate increases substantially as the conversion temperatures approach the boiling point of liquid white phosphorus (280° C.). Particles of red phosphorus form in the liquid phosphorus as the conversion proceeds. A process for continuous small scale production of a slurry of red phosphorus in liquid white phosphorus by conversion of liquid phosphorus near its boiling point was developed by the Tennessee Valley Authority and was reported by P. Miller, R. A. Wilson and J. R. Tusson, Industrial and Engineering Chemistry, 40, 357, (1948); a related patent is U.S. Pat. No. 2,397,951, (1943).

In the prior art process, the reactor employed was a vessel having a vertical cylindrical upper section and a conical bottom section. White phosphorus was continuously fed into the reactor which contained a continuously stirred slurry of about 40% red phosphorus particles in liquid white phosphorus. A constant liquid level in the reactor was maintained by continuous overflow of slurry from the vessel as white phosphorus was added. The feed rate, and consequently the rate of removal of slurry, was adjusted to provide residence time in the vessel sufficient to maintain 40% red phosphorus concentration in the slurry.

The reactor described in the Miller et al. article mentioned above was designed to operate with constant volume of about 32 gallons of slurry in the reactor. With that size reactor, the constant agitation obtained by use of two 7.5 inch diameter propellers driven with a one horsepower motor at 1140 rpm in the slurry was sufficient to prevent solids build-up on the reactor walls while avoiding excessive particle attrition in the slurry.

Using a similarly shaped reactor scaled up to 30 inch cylindrical diameter with a vertical cylindrical upper section, a right conical bottom section and operated with about 70 gallons of slurry in the reactor, several different agitation systems were tried without much success. In one trial, two 5-inch diameter, square pitch, three-blade turbine impellers, both pumping downward were driven at 1150 rpm on a single shaft. The impellers were spaced, on-center, at 10 inch and 23 inch respectively above the lowest point inside the conical bottom. The slurry was maintained at about 266° C. with the feed rate adjusted to keep the red phosphorus solids concentration at about 25% in the slurry. Four equally spaced vertical wall baffles were installed, 2½ inch wide normal to the cylinder wall. The baffles extended vertically upward from the bottom end of the cylindrical wall to above the liquid level in the cylindrical section. After 10 hours of continuous operation the agitator drive motor stalled and the entire vessel contents solidified to a mass of red phosphorus.

With the wall baffles removed, the same trial was repeated in the same vessel and with the same agitators and the same result ensued at the end of 4 days of continuous operation. Again, using the same 70 gallon reactor equipped with vertical baffles, the impellers were replaced at the same positions on the shaft by two 7½ inch diameter impellers. The bottom impeller was a radial turbine and the upper one was at 45° square-pitch turbine pumping downwards. These were turned at 430 rpm to agitate the slurry. At the end of one week of continuous operation, temperature cycling in the reactor forced a shutdown and, while the reactor walls were found to be practically clear of solids, the upper impeller was entirely encased in a large ball of solidified red phosphorus.

In still another attempt to scale up the phosphorus conversion, a vertical cylindrical tank was used as the reactor. Liquid phosphorus was continuously added at the rate of 180 lb./hr. to a 200 gallon reactor which was a 56 inch high, 36 inch diameter, vertical cylinder closed at the top and having a slightly dished bottom. A slurry containing approximately 25% red phosphorus in liquid phosphorus was continuously removed through an overflow port in the reactor wall at the level of the slurry surface. Electric heaters attached to the reactor walls maintained the reactor temperature at about 266° C. A 16-inch diameter, 3-inch wide, 4-blade, square-pitched (45°) turbine impeller, located 5 inches above the vessel bottom and pumping downward, was attached to a vertical shaft and rotated at 345 rpm to agitate the slurry. There were no baffles in the reactor. After 2 days operation the agitator stalled. On opening the reactor a build-up of solid red phosphorus was found on the reactor walls. This solids build-up varied in thickness from 2 inches to nearly 8 inches at various points on the wall; it greatly dimished the effective reactor volume and caused the agitator to stall. Before operation of the reactor could be resumed, the red phosphorus had to be laboriously dug out while keeping the solid phosphorus constantly wet with water to prevent it from burning in air.

After several such failures, it was recognized that finding a suitable means for agitation in a large reactor would be critical to the success of scaling up the continuous process.

The invention is directed particularly to the problems described above, which were found to accompany the scale-up size of the process described. A specific object of the invention was to provide a reactor for the particular process in which one could maintain a homogeneous slurry in the reactor during continuous operation without separation and accumulation of solid red phosphorus in the reactor and without causing excessive red phosphorus particle attrition.

It is difficult to maintain a slurry of solid red phosphorus in liquid white phosphorus in fluid form due to the tendency for agglomeration when adjacent particles remain in contact for extended periods of time. For a slurry concentration of about 50% by weight red phosphorus, it is calculated that all particles of red phosphorus would be in constant contact with others so that bridging or growing together of adjacent particles at the points of contact is almost certain to occur. Since the conversion reaction is exothermic, the conversion rate at reaction sites will accelerate unless locally generated heat of reaction is quickly dissipated. The weight average particles size is about 20 to 50 microns for slurries having concentrations in the range from 15 to 28 percent red phosphorus. The viscosity of concentrated slurries is greater than that of the liquid white phosphorus. The calculated viscosity of a 28% slurry of red phosphorus in white phosphorus is 3.5 times the viscosity of liquid white phosphorus alone. This higher viscosity may enhance interparticle growth by allowing touching particles to maintain contact longer, which could result in agglomeration. From all of the foregoing considerations it can be seen that constant mixing or agitation of the slurry is essential if solids build-up is to be avoided. Too little mixing or agitation would lead to concentration gradients which in turn may result in agglomeration in zones of high concentration of red phosphorus with consequent settling-out of larger agglomerates. Settled particles in contact will agglomerate by inter-particle growth and eventually form a solid mass of red phosphorus in the reactor.

Excessive impeller speed will cause centrifugal settling radially outward from the agitator impeller and this kind of settling can also lead to agglomeration and solids build-up. At excessive impeller speeds, the centrifugal force will exceed gravitational force as a cause of particle settling in an otherwise practical agitation system, and particularly so if wall baffles are not used.

Excessive agitation of the slurry will also cause breaking down of the particles of amorphous red phosphorus to produce a suspension of very fine particles (mainly below 1 micron). Such breaking down or attrition of particles occurs by impaction and abrasion of the particles in the agitated slurry. It has been found that a suspension of very fine particles of red phosphorus in liquid white phosphorus has a marked tendency to cause excessive foaming when the mixture is used for subsequent process steps in which the product slurry is used, for example when the liquid white phosphorus is removed from a product slurry by distillation.

According to the invention, in a phosphorus conversion process of the kind described, a slurry of red phosphorus particles in liquid white phosphorus is held at constant volume with constant feed-through in a vertical cylindrical tank having from two to six rigid vertical wall baffles. Each baffle is spaced about ½ to 2 inches away from the wall surface, and each extends vertically from a point at or near the bottom of the vertical section of the vessel wall upwards at least to the liquid surface level in the vessel. The baffle width extends radially inward in the cylinder about 1/15 to ⅛ of the tank diameter. Baffle thickness is sufficient to make the baffle rigid. The slurry is constantly agitated by one to three turbine impellers mounted coaxially in the cylinder on a vertical shaft with the bottom impeller pumping downwardly and any additional impellers pumping either downwardly or radially in the vessel. The diameter of each impeller is from 0.3 to 0.5 of the tank diameter. The bottom impeller is spaced above the tank bottom a distance of from 0.3 to 0.8 of the impeller diameter, on center. When more than one impeller is used, the vertical distance, between impellers is from 0.9 to 1.5 impeller diameters, on center. The impellers are rotated at peripheral speed of 600 to 1000 ft./min. To provide the most even distribution of heat transfer through the vessel walls and in order to minimize temperature gradients in the slurry, the reactor walls preferably are jacketed and a heat-transfer liquid is circulated through the jacket at a rate to maintain constant temperature in the reactor during operation.

The slurry in the tank is maintained with a proportion of solid red phosphorus in the range from 15 to 45 percent, by weight of the total phosphorus, suspended in the liquid white phosphorus. The height of the liquid level in the tank is about 0.8 to 1.5 times the tank diameter. Temperature of the phosphorus in the conversion reactor is maintained at a temperature in the range from about 220° C. to and including the boiling point of white phosphorus, which is 280° C. at atmospheric pressure and correspondingly higher or lower at other pressures. It is preferred to hold the temperature in the range from 260° to 270° C., i.e. just below boiling, to maintain a suitably high conversion rate without distilling.

The feed to the reactor is liquid white phosphorus and it is fed at a rate calculated to maintain the selected proportion of red phosphorus to total phosphorus in the conversion reactor. Slurry is removed at the same rate as white phosphorus is added to maintain constant volume of slurry in the tank.

The foregoing definition of certain parameters and elements in the reactor design and operation are found to be important for providing the kind of agitation in the slurry which is adequate to prevent accumulation of solids inside the reactor while avoiding excessive agitation to inhibit excessive attrition of red phosphorus solid particles.

The drawing shows a vertical cross-section of a reactor of a preferred design for carrying out the invention. Referring to the drawing the reactor vessel consists of a vertical cylinder 1 preferably of stainless steel and having a slightly dish-shaped bottom 2 and a flanged top with bolted-on lid 3. The outer wall of the vertical cylinder is surrounded with a cylindrical jacket enclosure 4 through which is circulated a heat-transfer liquid in contact with the reactor wall at a temperature selected for regulation of the slurry temperature inside the reactor. This jacket is fitted with a fluid inlet port 5 and a fluid outlet port 6 for circulation of heat-transfer liquid through the jacket enclosure. The reactor vessel is fitted with a fluid overflow outlet port, 7 positioned in the reactor wall at the selected height at which the liquid surface level is to be maintained in the reactor. This outlet port 7 leads through the jacket for transmission of product to receiving means beyond the reactor. A fluid inlet port 8 is placed at any convenient point in the vessel for feeding liquid white phosphorus into the reactor. We prefer to introduce white phosphorus at a point above the liquid level and opposed across the tank from the outlet port. Wall baffles 9 of any suitable material, preferably stainless steel, are rigidly mounted vertically inside the vessel extending vertically from a point at or near the bottom of the vertical wall upward to at least the selected liquid level in the reactor. Two to six of such baffles are spaced equidistant around the inside wall of the cylinder, each off-set a distance of 0.5 to 2 inches inward away from the reactor inner wall and mounted with suitable brackets or the like to the wall. Each baffle extends inward from 1/15 to ⅛ the cylinder radius and is of material thick enough to stay rigid in the vessel, such as 1/4 inch stainless steel plate or the like.

It is preferred to operate with two coaxial impellers below the liquid level in the reactor, the lower impeller 10 pumping downward and the upper impeller 11 pumping radially, but other arrangements having one to three impellers, sized, arranged and rotated on a drive shaft 12 as defined above, may be used.

EXAMPLE 1

In a reactor constructed as shown in FIG. 1 the height of the cylindrical tank to the lid is 56 inches and the diameter of the tank is 36 inches. The fluid outlet port is 44 inches above the tank bottom and four baffles extend vertically downward from the outlet port level to a point 6 inches above the tank bottom, where the edge of the dished bottom joins the cylindrical tank wall. Each baffle is 2½ inches wide, offset 1 inch from the wall. The four baffles are spaced apart equidistant around the cylindrical wall. Both impellers are 16 inches in diameter, 3 inches wide, 6-blade turbine impellers. The top impeller is a radial turbine located 25½ in. on center above the tank bottom. The lower impeller is a pitched (45°) blade turbine located 6½ inches on center above the tank bottom, pumping down. In the jacket, hot oil is circulated to maintain the slurry temperature at 260° C. Liquid white phosphorus is added continuously at a rate of 250 lb/hr. The reactor holds about 200 gallons and overflow is removed through the outlet port. After equilibrium is established, the slurry contains about 25% red phosphorus in the reactor. The reactor is operated continuously for 5 months, at the end of which the reactor was inspected and no trace of solids build-up was found.

We claim:

1. A process for production of solid red phosphorus by conversion of white phosphorus, comprising maintaining a constant volume of a phosphorus slurry having from 15 to 45% by weight solid red phosphorus in liquid white phosphorus at slurry temperature in the range from 220° C. up to boiling with constant conversion of white phosphorus to red phosphorus in said slurry and with feed of white phosphorus at a rate to maintain the slurry at the defined red phosphorus percentage composition and with withdrawal of part of said slurry for recovery of its red phosphorus content at a rate to maintain said constant volume, in a conversion vessel consisting of a vertical cylindrical tank having from two to six vertical wall baffles spaced apart at equal intervals around the interior wall of said cylindrical tank, each baffle extending vertically from near the bottom of said tank upward at least to the liquid surface level in said tank with each of said baffles offset inward from the tank wall from ½ to 2 inches and having baffle width measured radially in the cylinder from 1/15 to ⅛ of the tank diameter, and with one to three turbine impellers mounted coaxially in said cylindrical tank on a rotatable vertical shaft, with the bottom impeller having vanes for pumping liquid downward in said tank and with each additional one of said impellers having vanes for pumping liquid either downward or radially in said tank, the diameter of said impellers being from 0.3 to 0.5 of the tank diameter and the bottom impeller being mounted above the tank bottom a distance, on center, from 0.3 to 0.8 of the impeller diameter and with vertical distance on center between adjacent ones of said impellers from 0.9 to 1.5 of the impeller diameter, and with all of said impellers rotating constantly, below the liquid surface level of said slurry, at peripheral speed from 600 to 1000 ft. per min. for constant agitation of said slurry in said conversion vessel.

* * * * *